(12) United States Patent
Henry, Jr.

(10) Patent No.: US 6,208,877 B1
(45) Date of Patent: Mar. 27, 2001

(54) METHODS AND APPARATUS FOR SELECTIVELY DISPLAYING INFORMATION ENTERED FROM A RADIOTELEPHONE KEYPAD

(75) Inventor: Raymond C. Henry, Jr., Wake Forest, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 08/888,215

(22) Filed: Jul. 3, 1997

(51) Int. Cl.$^7$ ............................................. H04B 1/38
(52) U.S. Cl. ................ 455/566; 455/575; 455/158.4; 379/354; 379/93.23
(58) Field of Search ............................ 455/90, 566, 575, 455/410, 411, 25; 380/24; 705/18, 44; 345/168, 169, 156, 172; 713/202

(56) References Cited

U.S. PATENT DOCUMENTS

| | | | |
|---|---|---|---|
| 5,226,080 | * | 7/1993 | Cole et al. ............................. 380/25 |
| 5,267,146 | * | 11/1993 | Anada et al. ......................... 364/408 |
| 5,349,629 | * | 9/1994 | Kumano ................................ 455/566 |
| 5,582,783 | * | 12/1996 | Tabe et al. ............................ 455/566 |
| 5,771,446 | * | 6/1998 | Wilkinson ............................. 455/410 |
| 5,778,071 | * | 7/1998 | Caputo et al. ......................... 380/25 |

FOREIGN PATENT DOCUMENTS

H08-181755 * 7/1996 (JP) .............................. H04B/7/26

* cited by examiner

Primary Examiner—Nguyen Vo
Assistant Examiner—Greta J. Fuller
(74) Attorney, Agent, or Firm—Myers Bigel Sibley & Sajovec

(57) ABSTRACT

In particular, according to the present invention, information is selectively displayed on a graphical display of a radiotelephone by suppressing display of information entered into the radiotelephone from a keypad of the radiotelephone as the information is entered. The suppression may occur after the radiotelephone is placed in to a display-suppressed state. Display of the entered information may be suppressed by displaying information other than the entered information. For example, a single character may be repetitively displayed in response to a plurality of different keystrokes performed on the keypad, or a blank display may be provided in response to a plurality of different keystrokes performed on the keypad. According to other aspects, the state of the radiotelephone may be controlled manually or automatically. The radiotelephone may be placed in one of the display-suppressed state or a non-display-suppressed state by entering a predetermined command from the keypad. Alternatively, information may be communicated between the radiotelephone and a station external to the radiotelephone to place the radiotelephone in one of the display-suppressed state or the non-display-suppressed state. A communication session between the radiotelephone and the station may be terminated to place the radiotelephone in the non-display-suppressed state. Related radiotelephone apparatus is also discussed.

14 Claims, 5 Drawing Sheets

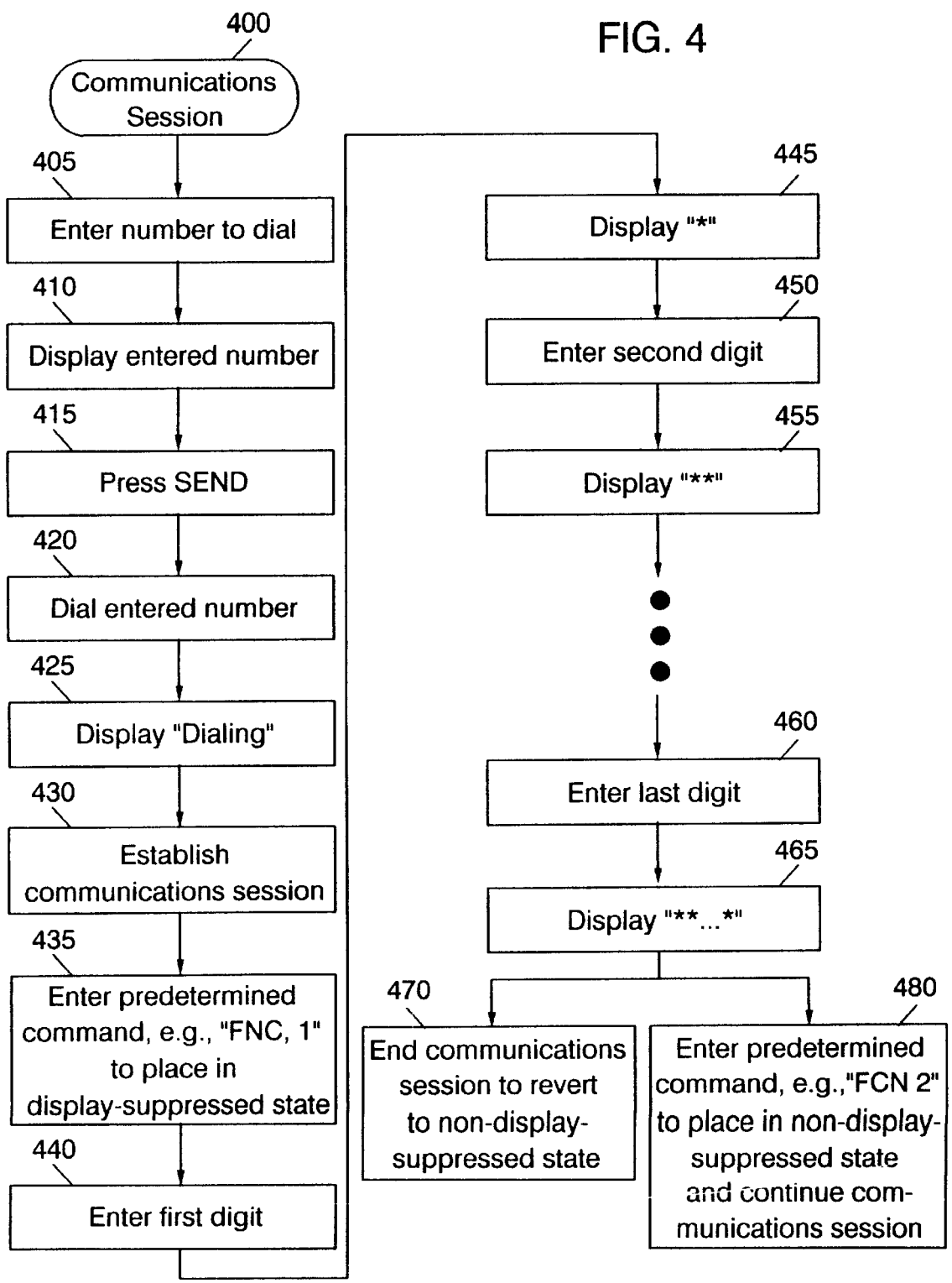

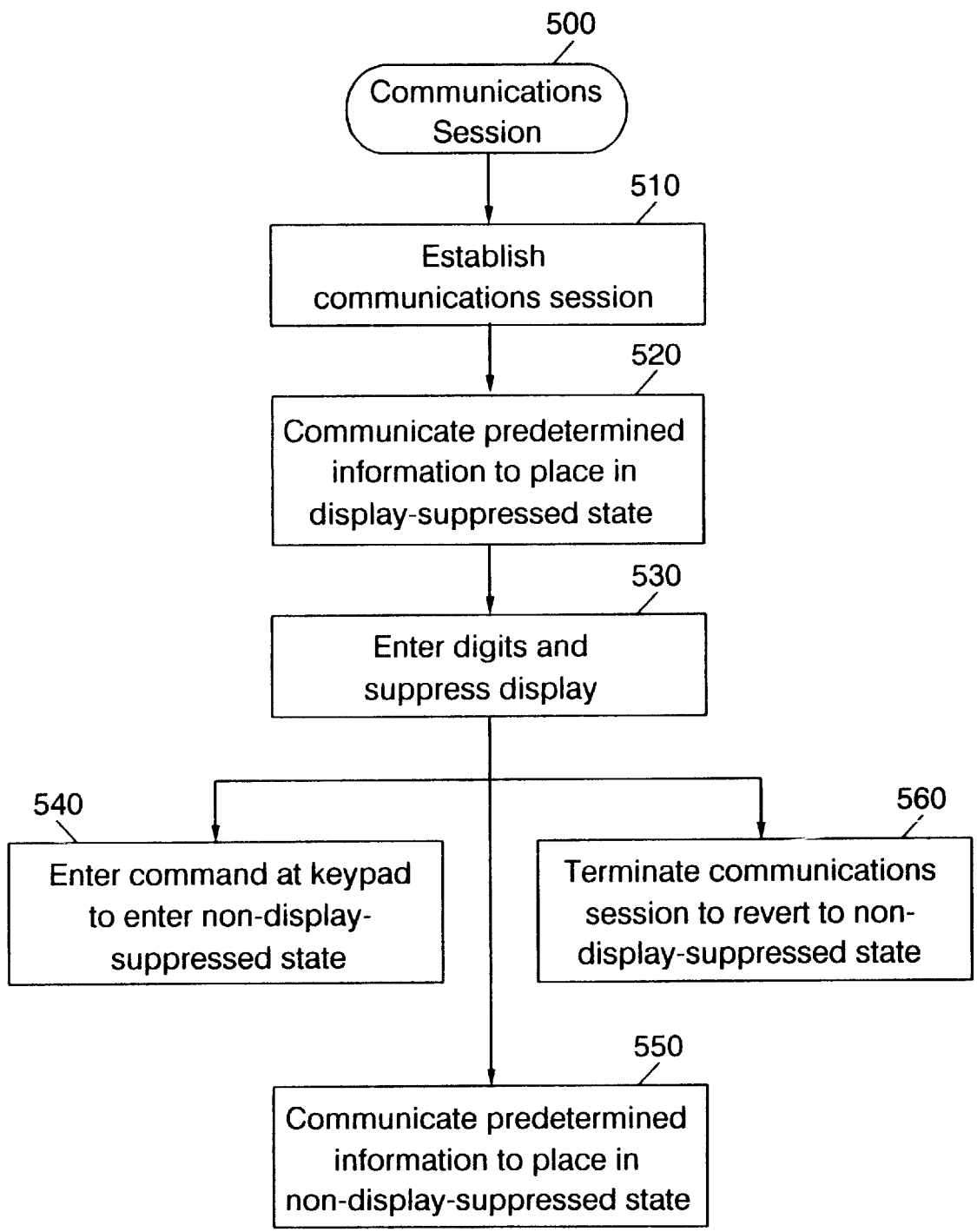

METHODS AND APPARATUS FOR SELECTIVELY DISPLAYING INFORMATION ENTERED FROM A RADIOTELEPHONE KEYPAD

FIELD OF THE INVENTION

The present invention relates to methods and apparatus for radiotelephone communications, in particular, to methods and apparatus for displaying information on a radiotelephone.

BACKGROUND OF THE INVENTION

Cellular radiotelephones are commonly used to access many different types of systems, including voice mail and corporate information systems. Communications with these systems may often involve the entry of sensitive or proprietary information such as passwords from the keypad of the cellular radiotelephone.

Conventional radiotelephones typically display digits entered from the keypad as the keystrokes are performed. In addition, many conventional radiotelephones are able to recall previously entered digits. Because radiotelephones may often be operated in public places in which onlookers may view the radiotelephone's graphical display, or may be used by multiple parties, these features may lead to an unintended release of sensitive information.

Some conventional radiotelephones allow a user to manually clear display entries, as illustrated in FIG. 1. Referring to FIG. 1, a typical sequence for a call transaction (Block 100) may involve entering a number to dial (Block 110), pressing a send key (Block 120) and dialing the number (Block 130). After a communications session is established (Block 140), an additional transaction involving entry of sensitive information from the keypad may occur, e.g., entry of a personal identification number (PIN) (Block 150). After the communication session is ended by pressing an "END" key (Block 160) on the keypad, a "clear" (CLR) key on the keypad may be pressed (Block 170) to blank the display (Block 180).

In such a sequence, however, the PIN remains displayed until the call is terminated, allowing unauthorized onlookers to gain access to this sensitive information. In addition, should the user neglect to press the CLR key, others may gain access to the sensitive information.

SUMMARY OF THE INVENTION

In light of the foregoing, it is an object of the present invention to provide methods and apparatus for displaying information on a radiotelephone which provide improved security for sensitive information entered from the radiotelephone keypad.

It is another object of the present invention to provide methods and apparatus for displaying information on a radiotelephone which are convenient for a user of the radiotelephone.

These and other objects, features and advantages are provided according to the present invention by radiotelephone apparatus and methods in which display of information entered from a keypad of a radiotelephone is suppressed as it is entered. Preferably, the radiotelephone may be placed into a display-suppressed mode, either manually in response to entry of a command from the keypad or automatically in response to communication between the radiotelephone and a station external to the radiotelephone. The radiotelephone may be manually taken out of the display-suppressed mode by a similar keypad command, by another communication with the other station, or by termination of the communications session with the other station. The display may be suppressed by providing a blank display in response to keypad entries or by displaying information other than the entered information, such as by repetitively displaying a single character in response to a plurality of different keystrokes.

By suppressing display of keypad entries, the present invention can provide enhanced security for information entered by the user of the radiotelephone. Onlookers can be prevented from discerning entered information, as all they may see is a blank screen or a string of repeated characters. Because display of the information is suppressed as it is entered, the user does not have to wait until a call is terminated to clear the display. In addition, because the display can be automatically suppressed, the user does not have to remember to clear the display at the end of a call.

In particular, according to the present invention, information is selectively displayed on a graphical display of a radiotelephone by suppressing display of information entered into the radiotelephone from a keypad of the radiotelephone as the information is entered. The suppression may occur after the radiotelephone is placed in to a display-suppressed state. Display of the entered information may be suppressed by displaying information other than the entered information. For example, a single character may be repetitively displayed in response to a plurality of different keystrokes performed on the keypad, or a blank display may be provided in response to a plurality of different keystrokes performed on the keypad.

According to one aspect of the present invention, the radiotelephone is placed in the display-suppressed state, and display of information entered from the keyboard is subsequently suppressed until the radiotelephone is placed in a non-displayed-suppressed state. After placing the radiotelephone in the non-display-suppressed state, information entered from the keypad is displayed.

According to other aspects of the present invention, the state of the radiotelephone may be controlled manually or automatically, The radiotelephone may be placed in one of the display-suppressed state or the non-display-suppressed state by entering a predetermined command from the keypad. Alternatively, the information may be communicated between the radiotelephone and a station external to the radiotelephone to place the radiotelephone in one of the display-suppressed state or the non-display-suppressed state. For example, information may be communicated to establish a communication session between the radiotelephone and the station and the radiotelephone may be placed in the display-suppressed state in response to establishment of the communications session between the radiotelephone and the station. A communication session between the radiotelephone and the station may be terminated to place the radiotelephone in the non-display-suppressed state.

A radiotelephone according to the present invention includes a keypad, a graphical display and means, responsive to the keypad and operatively associated with the display, for suppressing display of information entered from the keypad on the graphical display as the information is entered. The radiotelephone may further include means for placing the radiotelephone in one of a display-suppressed state or a non-display-suppressed state, and the means for suppressing may include means for suppressing display of information entered from the keypad if the radiotelephone is in the display-suppressed state. The means for suppressing may include includes means for displaying information other than the entered information in response to entry of the entered information, such as means for repetitively displaying a character or means for providing a blank display in response to a plurality of different keystrokes performed on the keypad.

The means for placing the radiotelephone in one of the displayed-suppressed state or the non-display-suppressed state includes means for accepting a predetermined command from the keypad to place the radiotelephone in one of the display-suppressed state or the non-display-suppressed state. The means for placing the radiotelephone in one of the displayed-suppressed state or the non-display-suppressed state may include means for placing the radiotelephone in one of the display-suppressed state or the non-display-suppressed state in response to communication of predetermined information between the radiotelephone and a station external to the radiotelephone. The means for placing the radiotelephone in one of the display-suppressed state and the non-display-suppressed state may include means for placing the radiotelephone in the display-suppressed state in response to establishment of a communications session between the radiotelephone and the station. The radiotelephone may also include means for placing the radiotelephone in the non-display-suppressed state in response to termination of a communications session between the radiotelephone and the external station. Radiotelephones with improved security for sensitive information may thereby be provided.

BRIEF DESCRIPTION OF THE DRAWINGS

Some of the objects and advantages of the present invention having been stated, others will be more fully understood from the detailed description that follows and by reference to the accompanying drawings in which:

FIG. 4 illustrates operations for a radiotelephone transaction according to a first aspect of the present invention; and FIG. 5 illustrates operations for a radiotelephone transaction according to a second aspect of the present invention.

DETAILED DESCRIPTION OF PREFERRED EMBODIMENTS

Figure 1:
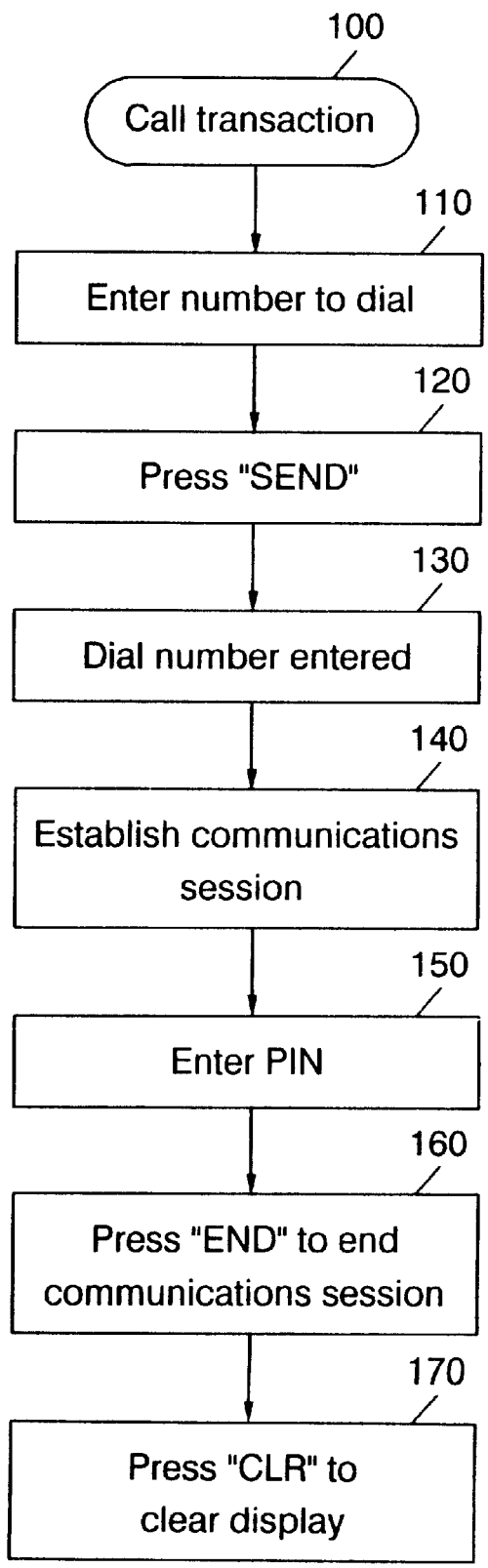
FIG. 1 illustrates operations for a conventional radiotelephone transaction.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 2:
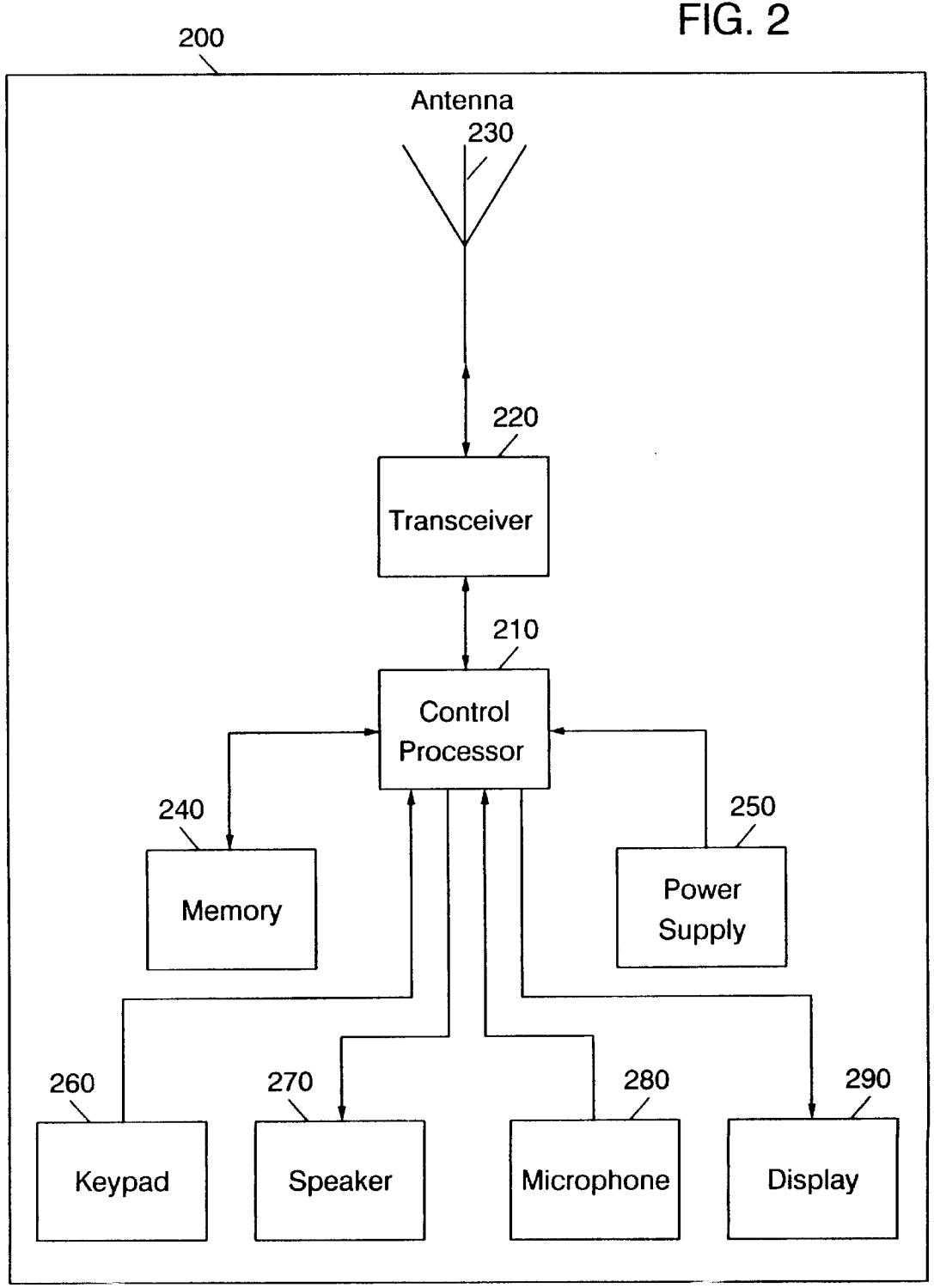
FIGS. 2–3 illustrates a radiotelephone according to the present invention.
Figure 3:
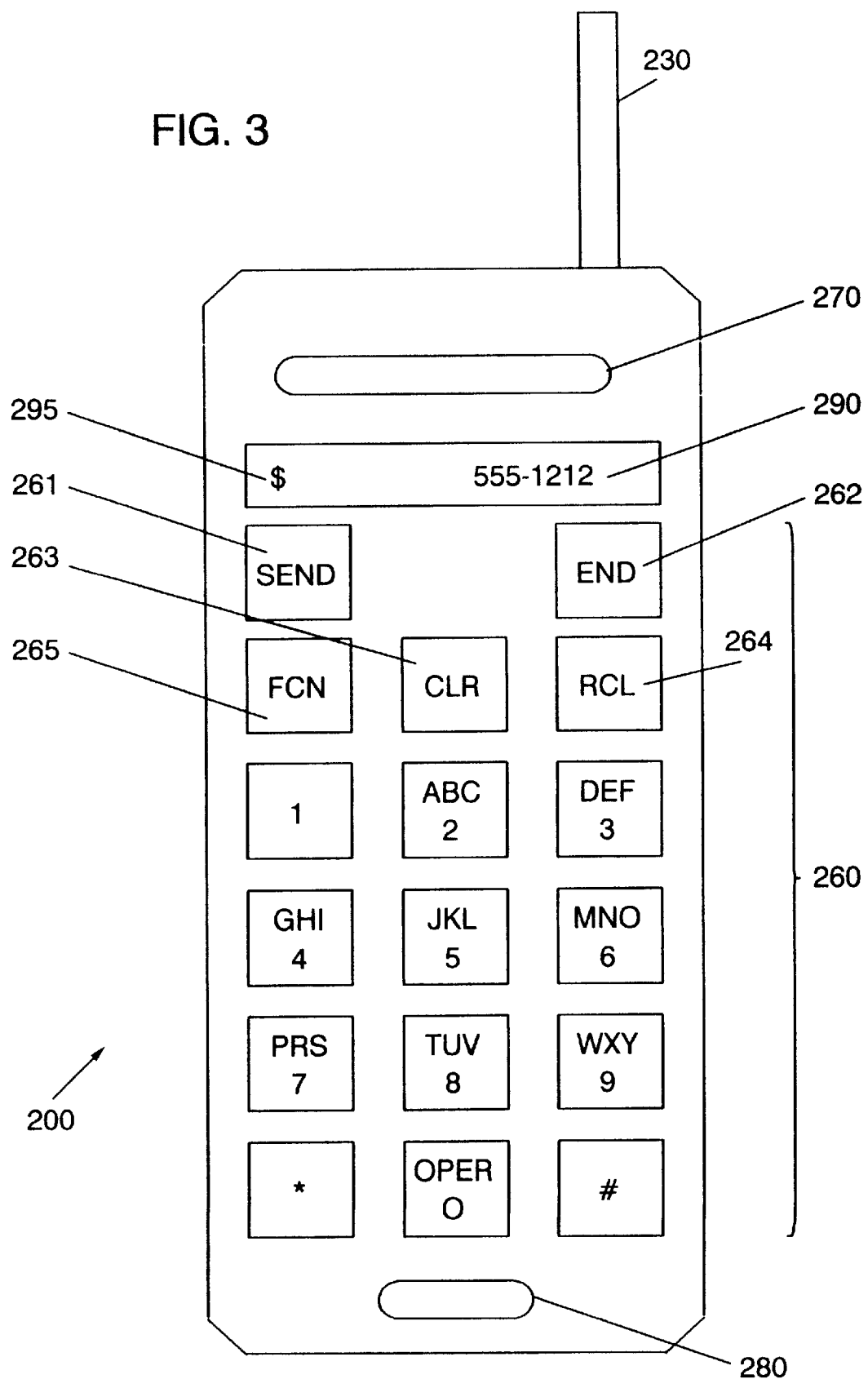

Those skilled in the art will appreciate that the apparatus and operations of the present invention may be implemented using a communications terminal such the cellular radiotelephone 200 illustrated in FIGS. 2 and 3. The radiotelephone 200 includes a control processor, e.g., a microprocessor, which controls operations of a transceiver 220, which sends and receives communications signals from an antenna 230. The control processor 210 is operatively associated with memory 240, e.g., random access memory (RAM), programmable read only memory (PROM) and the like, for storage of operating programs and data. Power supply 250 supplies power to the control processor 220 and other elements of the radiotelephone 200. The control processor 210 also is operatively associated with a keypad 260, a speaker 270, a microphone 280 and a graphical display 290. As illustrated in FIG. 3, the display 290 may be an alphanumeric display which may include one or more graphical fields 295. In the illustrated embodiment, the keypad 260 may include DTMF keys commonly found on telephones, a send key 261, an end key 262, a clear key 263 and a recall key 264. In addition to these keys, one or more special function keys 265 may be provided to allow a user to enter special commands.

FIGS. 4 and 5 are flowchart illustrations of methods and apparatus which may be implemented on a radiotelephone such as the radiotelephone 200 illustrated in FIGS. 2 and 3. It will be understood that each block of the flowchart illustrations, and combinations of blocks in the flowchart illustrations, can be implemented by computer program instructions. These computer program instructions may be loaded onto a computer or other programmable data processing apparatus, e.g., the control processor 10 of the radiotelephone 200, to produce a machine such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 4 illustrates operations for a radiotelephone communications session according to a first aspect of the present invention (Block 400) in which display of entered information is suppressed in response to a manual command which places the radiotelephone in a display-suppressed state. A number to be dialed is entered from the keypad (Block 405) and displayed on the graphical display (Block 410). The user then presses the "SEND" button on the keypad (Block 415) to cause the radiotelephone to dial the entered number (Block 420). Concurrently, the radiotelephone may display a status message, e.g, "DIALING" (Block 425). After communications are established with another station (Block 430), the user may be required to enter sensitive information such as a PIN. Before entering the number, the user places the radiotelephone in a display-suppressed state by, for example, performing a predetermined sequence of keystrokes, e.g., "FCN, 1" (Block 435). The user then enters a first digit (Block 440), and the radiotelephone displays a "nonsense" character other than the entered digit, for example, a "*" (Block 445). Another digit is entered (Block 450), and another nonsense character is displayed (Block 455). This sequence may be continued until a last digit is entered (Block 460), and a last nonsense character is displayed (Block 460).

To exit the display-suppressed state, a number of actions may occur. The user may terminate the communications session to automatically cause the radiotelephone to revert to a non-display-suppressed state (Block 470). Alternatively, the user may enter a predetermined sequence of keystrokes, perhaps the same keystrokes used to enter the display-suppressed state, to place the radiotelephone in a non-display-suppressed state (Block 480), after which the communications session may continue.

FIG. 5 illustrate operations for a radiotelephone communications session according to a second aspect of the present invention (Block 500) in which the radiotelephone is placed in a display-suppressed state automatically. After a call is established between the radiotelephone and an external station (Block 510), a predetermined communication may occur between the radiotelephone and the external station (Block 520) which causes a transition to a display-suppressed state, for example, a communication involved in establishing the session. While the radiotelephone is in the display-suppressed state, the user may enter information which is not displayed on the graphical display of the radiotelephone (Block 530). From this point, several courses of action may be available to the user. For example, the user may enter predetermined sequence keystrokes (Block 540) which places the radiotelephone in a non-display-suppressed state as the communications session continues. Alternatively, a predetermined communication may occur between the radiotelephone and the external station which places the radiotelephone in the non-display-suppressed state (Block 550). In addition, the communications session may be terminated to cause the radiotelephone to automatically revert to the non-display-suppressed state (Block 560).

Those skilled in the art will appreciate that numerous variations of the operations described above may be practiced within the scope of the present invention. For example, instead of displaying noninformative characters such as "*" in the display-suppressed state, the radiotelephone may simply provide a blank display. Those skilled in the art will also appreciate that the above-described techniques for entering and exiting the display-suppressed state may be used in various combinations, e.g., the radiotelephone may be manually placed in the display-suppressed state by a keypad entry and exit the display-suppressed state either manually or automatically.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of selectively displaying information on a graphical display of a radiotelephone, the method comprising the steps of:

placing the radiotelephone in one of a display-suppressed state and a non-display- suppressed state in response to receiving information at the radiotelephone from a station external to the radiotelephone;

suppressing the display of the information on the graphical display as the information is entered via the keypad when the radiotelephone is in the display-suppressed state; and displaying the information on the graphical display as the information is entered via the keypad when the radiotelephone is in the non-display-suppressed state.

2. A method according to claim 1, wherein said step of suppressing comprises the step of displaying information other than the entered information.

3. A method according to claim 2, wherein said step of displaying comprises the step of repetitively displaying a character in response to a plurality of different keystrokes performed on the keypad.

4. A method according to claim 1, wherein said step of suppressing comprises the step of providing a blank display in response to a plurality of different keystrokes performed on the keypad.

5. A method according to claim 1:

wherein said step of placing comprises the state of placing the radiotelephone in the display-suppressed state;

wherein said step of suppressing comprises the step of suppressing display of information entered from the keypad; and wherein said step of suppressing is followed by the step of placing the radiotelephone in the non-display-suppressed state.

6. A method according to claim 5, wherein said step of placing the radiotelephone in the non-display-suppressed state is followed by the step of displaying information entered from the keypad.

7. A method according to claim 1, wherein said step of placing comprises the steps of:

communicating information to establish a communication session between the radiotelephone and the station; and placing the radiotelephone in the display-suppressed state in response to establishment of the communications session between the radiotelephone and the station.

8. A method according to claim 1, wherein said step of suppressing is followed by the step of terminating a communications session between the radiotelephone and the station to place the radiotelephone in the non-display-suppressed state.

9. A radiotelephone comprising:

a keypad for entering information into the radiotelephone;

a graphical display that displays information;

means for placing the radiotelephone in one of a display-suppressed state and a non- display-suppressed state in response to receiving information at the radiotelephone from a station external to the radiotelephone;

means, responsive to the keypad and operatively associated with the graphical display, for suppressing the display of the information on the graphical display as the information is entered via the keypad when the radiotelephone is in the display-suppressed state; and means, responsive to the keypad and operatively associated with the graphical display, for displaying the information on the graphical display as the information is entered via the keypad when the radiotelephone is in the non-display-suppressed state.

10. A radiotelephone according to claim 9, wherein said means for suppressing comprises means for displaying information other than the entered information in response to entry of the entered information.

11. A radiotelephone according to claim 10, wherein said means for displaying comprises means for repetitively displaying a character in response to a plurality of different keystrokes performed on the keypad.

12. A radiotelephone according to claim 9, wherein said means for suppressing comprises means for providing a blank display in response to a plurality of different keystrokes performed on the keypad.

13. A radiotelephone according to claim 9, wherein said means for placing the radiotelephone in one of the display-suppressed state or the non-display-suppressed state in response to communication of predetermined information comprises means for placing the radiotelephone in the display-suppressed state in response to establishment of a communications session between the radiotelephone and the station.

14. A radiotelephone according to claim 9, comprising means for placing the radiotelephone in the non-display-suppressed state in response to termination of a communications session between the radiotelephone and the external station.

* * * * *